(12) United States Patent
Adamczak et al.

(10) Patent No.: US 8,726,791 B2
(45) Date of Patent: May 20, 2014

(54) HOUSEHOLD APPLIANCE HAVING A CONTROL PANEL AND HAVING A TANK FOR ACCOMMODATING A FLUID

(75) Inventors: Juergen Adamczak, Leopoldshoehe (DE); Uwe Berger, Kirchlengern (DE); Ruediger Hoehn, Hiddenhausen (DE); Franz Thorman, Bielefeld (DE); Wolfgang Wieneke, Buende (DE)

(73) Assignee: Miele & Cie. KG, Guetersloh (DE)

( * ) Notice: Subject to any disclaimer, the term of this patent is extended or adjusted under 35 U.S.C. 154(b) by 997 days.

(21) Appl. No.: 12/682,178

(22) PCT Filed: Sep. 13, 2008

(86) PCT No.: PCT/EP2008/007599
§ 371 (c)(1),
(2), (4) Date: Apr. 8, 2010

(87) PCT Pub. No.: WO2009/046811
PCT Pub. Date: Apr. 16, 2009

(65) Prior Publication Data
US 2010/0206414 A1    Aug. 19, 2010

(30) Foreign Application Priority Data
Oct. 8, 2007  (DE) .......................... 10 2007 048 200

(51) Int. Cl.
*A47J 27/00*    (2006.01)
*A21B 1/08*    (2006.01)
*F16L 37/05*    (2006.01)
*A21B 1/00*    (2006.01)

(52) U.S. Cl.
USPC ................... 99/330; 99/400; 99/417; 99/467; 99/473; 99/516; 126/20; 126/21 A; 126/369; 137/798; 137/800; 219/391; 312/236

(58) Field of Classification Search
USPC .................. 99/325–332, 339, 340, 400, 401, 99/444–446, 467, 468, 469, 473–476, 480, 99/483, 516, 534, 536, 410–415, 417; 126/20, 21 A, 369, 369.1, 369.2, 20.1, 126/20.2; 137/798, 800; 219/401, 444, 442, 219/385, 386, 521, 391; 312/236
See application file for complete search history.

(56) References Cited

U.S. PATENT DOCUMENTS 2,808,497 A * 10/1957 Kesling et al. ........... 219/448.11
3,027,216 A * 3/1962 Van Alstyne et al. ......... 312/271

FOREIGN PATENT DOCUMENTS

| DE | 9400648 U1 | 8/1994 |
| DE | 19701033 A1 | 7/1997 |
| DE | 102007041822 A1 | 3/2009 |
| EP | 388375 A2 * | 9/1990 ................ F24C 3/12 |

* cited by examiner

*Primary Examiner* — Dana Ross
*Assistant Examiner* — Ket D Dang
(74) *Attorney, Agent, or Firm* — Leydig, Voit & Mayer, Ltd.

(57) ABSTRACT

A household appliance includes a control panel that is movable between a rest position and an exposed position. A reservoir, which is adapted for holding a fluid, has a filling opening and is positioned behind the control panel in an interior of the household appliance when the reservoir is in an operating position. The control panel is configured to impede access to the reservoir and/or the filling opening when the control panel is in the rest position and the reservoir is in the operating position. The control panel is further configured to allow access to the reservoir and/or the filling opening when the control panel is moved to the exposed position.

9 Claims, 4 Drawing Sheets

HOUSEHOLD APPLIANCE HAVING A CONTROL PANEL AND HAVING A TANK FOR ACCOMMODATING A FLUID

CROSS-REFERENCE TO PRIOR APPLICATIONS

This application is a U.S. National Phase application under 35 U.S.C. §371 of International Application No. PCT/EP2008/007599, filed on Sep. 13, 2008 and claims benefit to German Patent Application No. DE 10 2007 048 200.2, filed on Oct. 8, 2007. The International Application was published in German on Apr. 16, 2009 as WO 2009/046811 A1 under PCT Article 21(2).

FIELD

The present disclosure relates to a household appliances and, more particularly, to a household appliance having a moveable control panel that can inhibit or permit access to a an internal reservoir of the appliance.

BACKGROUND

One example of a known household appliance is described in DE 94 00 648 U1, which describes a cooking appliance including moistening means and which has a control panel and a reservoir for holding a fluid. The reservoir is provided with a filling opening allowing it to be filled with the fluid. When the reservoir is in the operating position, it is located behind the control panel in the interior of the household appliance. In order to fill in the fluid, the reservoir, which is in the form of a water drawer, is partially pulled out through the control panel in a forward direction.

SUMMARY

In an embodiment, the present invention provides a household appliance, which includes a control panel that is movable between a rest position and an exposed position. A reservoir, which is adapted for holding a fluid, has a filling opening through which the reservoir may be filled with the fluid. When the reservoir is in an operating position, the reservoir is disposed behind the control panel in an interior of the household appliance. The control panel is configured to impede access to at least one of the reservoir and the filling opening when the control panel is in the rest position and the reservoir is in the operating position. The control panel is further configured to allow access to at least one of the reservoir and the filling opening when the control panel is in the exposed position.

BRIEF DESCRIPTION OF THE DRAWINGS

An exemplary embodiment of the present invention is shown in the drawings in a purely schematic way and will be described in more detail below. In the drawings.

DETAILED DESCRIPTION

Figure 1:
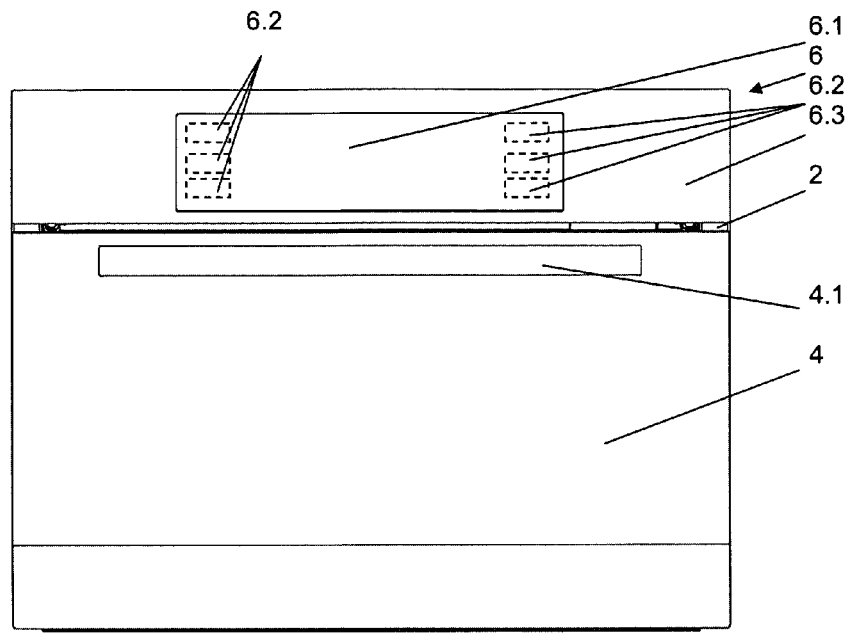
FIG. 1 is a front view of a household appliance according to the present invention, showing the control panel in the rest position.

In one embodiment, the present disclosure describes a household appliance including a control panel and a reservoir for holding a fluid in such a manner that the overall aesthetic appearance of the front of the household appliance is improved.

A particular advantage achieved by the present invention is that it improves the overall aesthetic appearance of the front of the household appliance, and thus, of the entire household appliance. This is a great advantage, especially in built-in appliances, because in such appliances, only the front of the appliance is accessible and visible to the user. In addition, during normal operation, the entire surface of the user interface of the control panel can be used for controlling the operation of the household appliance, i.e., for selecting operation cycles, parameters and cycle settings. There is no need to provide an opening in the control panel for filling and/or removal of the reservoir. The reservoir, in particular its front face, does not have to be matched in appearance to the front of the household appliance to enhance the overall visual appearance thereof. This is a substantial advantage, given the large number of variants that must be covered because of the great variety of models available today.

The control panel can, in principle, be freely selected within wide suitable limits in terms of type, material, geometric configuration, and the way in which it is mounted on the remainder of the household appliance.

Advantageously, when the control panel is in the rest position and the household appliance is in the operating position, the control panel is located at the upper edge of the household appliance, and when in the exposed position, it assumes a position above the rest position. Many household appliances have a treatment chamber that can be closed by a door, and are either installed, for example, into a run of kitchen base cabinets, or stand on the floor. Therefore, from an ergonomic point of view, it is useful to dispose the control panel above the treatment chamber. The design of the present invention ensures that the control panel does not collide with an open door when in or moving to the exposed position. Moreover, when the control panel is in the exposed position, it does not impede access to the interior of the treatment chamber.

In an advantageous embodiment, when the control panel is in the exposed position and the household appliance is in the operating position, the control panel is located in front of the front of the household appliance. Because of this, the front of the household appliance and the control panel, in its rest position, may be disposed in one plane.

In principle, the control panel may be held, for example, pivotally, directly to the body of a household appliance according to the present invention. Then, the control panel can, for example, be force-transmittingly connected to a positioning mechanism which is secured to the body of the household appliance. Advantageously, the control panel is mounted on a positioning mechanism secured to the body of the household appliance. This increases the freedom of design and construction for the control panel.

In an advantageous refinement of the last-mentioned embodiment, when the positioning mechanism moves the control panel from the rest position to the exposed position, the control panel is first moved to an intermediate position in front of or forward of the front of the household appliance, and then from the intermediate position to the exposed position. In this manner, the household appliance of the present invention is effectively prevented from colliding with other components thereof, or with adjacent furniture units or devices, such as handles or the like, as it moves to the exposed position.

In another advantageous embodiment, the positioning mechanism is designed such that the angle of inclination that the user interface of the control panel forms with the remainder of the household appliance when it is in the exposed position or moved to the exposed position is substantially equal to the angle of inclination of the user interface in the rest position. In this manner, it is achieved that the user interface is always presented at the same angle to the user, independently of its current spatial position. This increases the ease and reliability of use of the household appliance.

In principle, the reservoir may be undetachably mounted inside the appliance. It is only required that the filling opening of the reservoir be accessible when the control panel is in the exposed position in order to allow the reservoir to be filled with the fluid. Advantageously, the reservoir is removably supported in a housing located behind the control panel inside the household appliance. This greatly facilitates the filling of the reservoir with the fluid.

A particularly advantageous refinement of the aforementioned embodiment provides that the control panel and the housing be coupled together by a coupling mechanism in such a way that when the control panel moves from the rest position to the exposed position, the housing is automatically movable from a position in which it is incorporated in the body to a filling position which allows the reservoir to be filled with the fluid or to be removed. This further facilitates the removal of the reservoir from the appliance and its insertion into the appliance.

The same is true for the advantageous refinement, namely that the control panel and the housing are coupled together by a coupling mechanism in such a way that when the control panel moves from the exposed position to the rest position, the housing is automatically movable from a filling position, which allows the reservoir to be filled with the fluid or to be removed, to a position in which it is incorporated in the body.

In principle, it is possible for the control panel to be movable only by hand. Advantageously, the control panel, or the positioning mechanism for moving the control panel between the rest position and the exposed position, has a drive means. For example, it would be conceivable for the control panel or the positioning mechanism to be retained in position by locking means against a preloaded gas spring or the like when the control panel is in the rest position, and to be automatically moved to the exposed position by the gas spring after releasing the locking means. In order to return the control panel to the rest position, the user pushes the control panel in the opposite direction against the force of the gas spring until the locking means is in the locking position again. Alternatively, in a more convenient embodiment, an electromechanical drive may be provided for this purpose, which may be controlled through actuation of a control or in a program-controlled manner by an appliance controller, so as to move the control panel to the exposed position or to the rest position.

FIG. 1 shows a household appliance according to the present invention. Here, the household appliance is in the form of a steam cooking appliance. The steam cooking appliance includes a body 2. Body 2 has a treatment chamber (not shown) provided therein, which can be closed by a door 4 having a door handle 4.1. The steam cooking appliance is designed as a built-in appliance and is shown in FIG. 1 in the operating position. A control panel 6 is disposed above the treatment chamber, and thus above door 4. Control panel 6 has a graphics-capable display 6.1. Display 6.1 has touch-sensitive areas 6.2, known as touch controls, for user control. Display 6.1 and controls 6.2 are disposed on user interface 6.3 of control panel 6, which faces toward the user. Using controls 6.2 and display 6.1, the user can control the operation of the steam cooking appliance in a known manner, such as, for example, to select and start cooking cycles. To this end, display 6.1 and controls 6.2 are connected in signal communication with an appliance controller (not shown) in a manner known to those skilled in the art. Control panel 6 is movably mounted to body 2 in a manner further described below, and is shown in FIG. 1 in the rest position.

Figure 2:
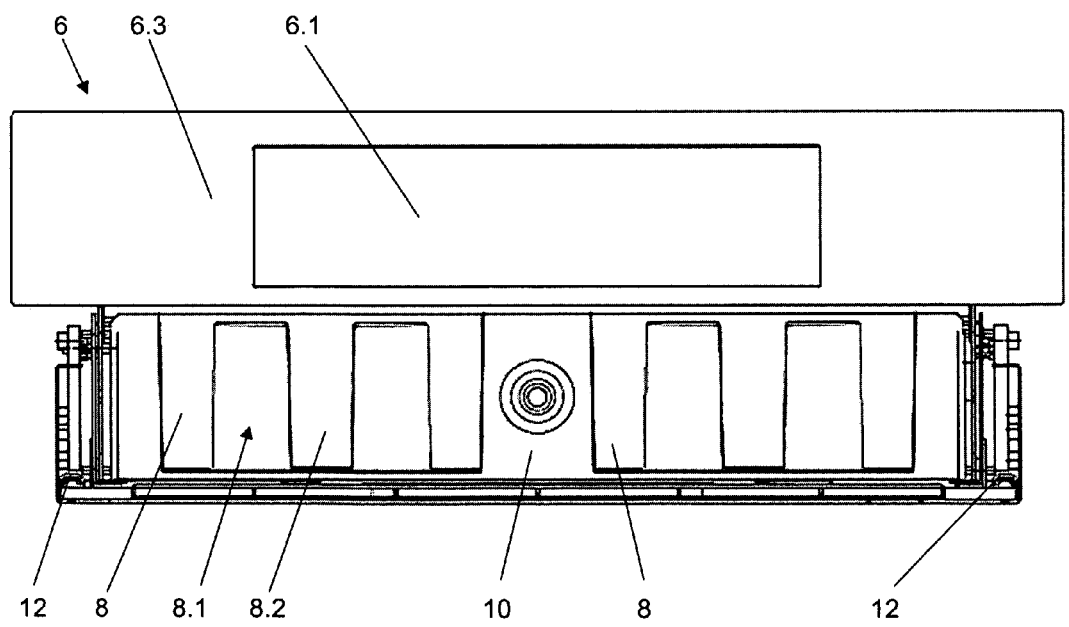
FIG. 2 is a partial detail view showing a portion the household appliance of FIG. 1 in the region of the control panel, with the control panel in the exposed position.

FIG. 2 shows the steam cooking appliance of FIG. 1 in a detail view, showing control panel 6 in the exposed position. When in the exposed position, control panel 6 is swung upward, so that the space located behind control panel 6 in the interior of body 6 when control panel 6 is in the rest position is accessible to the user. Here, this space accommodates two reservoirs 8. Reservoirs 8 are used to hold water and are removably disposed in a housing 10. To this end, reservoirs 8 are provided with handle recesses 8.1 and handles 8.2. Housing 10 is movably held on two telescoping rail assemblies 12, so that housing 10 can be moved out of said space in a forward direction; i.e., out of the plane of the drawing, when control panel 6 is in the exposed position.

Figure 3:
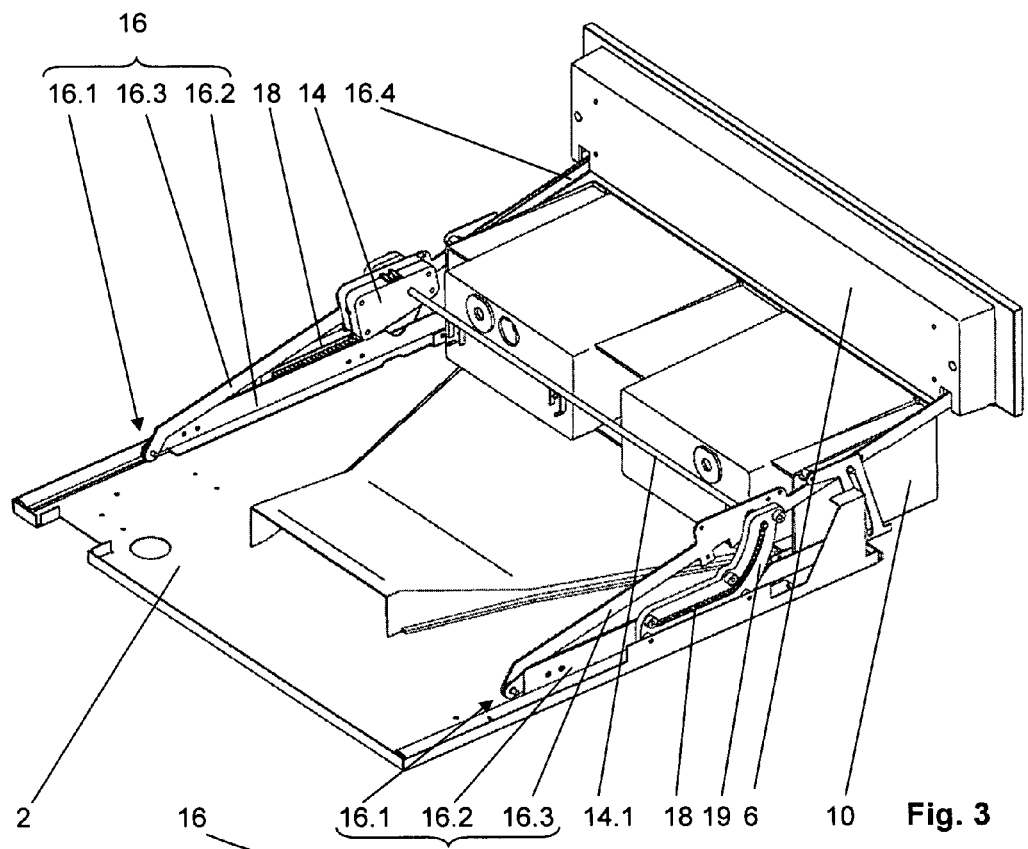
FIG. 3 is a perspective partial view showing the household appliance from above.

Here, control panel 6 is moved back and forth between the rest position and the exposed position by a drive means 14, which is shown in FIG. 3. To this end, drive means 14, which is in the form of an electric motor, is controlled by the appliance controller in a manner known to those skilled in the art. In the present exemplary embodiment, to move control panel 6 from the rest position to the exposed position, the user actuates a predetermined control 6.2. In order to return the control panel to the rest position, this control 6.2 must then be actuated again. In order to prevent the household appliance from being damaged by improper use, the correct position of reservoirs 8 when inserted in housing 10 is detected by sensor means and processed in the appliance controller in a manner known to those skilled in the art. If at least one reservoir 8 is not correctly inserted in housing 10, control panel 6 will not be moved to the rest position, even if control 6.2 is actuated.

Control panel 6 is held to body 2 via a positioning mechanism 16. On both sides of housing 10, the positioning mechanism 16 shown herein has two bars 16.2 and 16.3 which are pivotally connected to each other by an articulated joint 16.1. Drive means 14 is mounted on one of bars 16.3. Output shaft 14.1 of drive means 14 is provided at each end with a pinion 14.2, one of which is shown in more detail in FIG. 5. Each of pinions 14.2 meshes with a toothed rack 18 attached to the body.

In the present exemplary embodiment, in order for housing 10 to be automatically moved out of body 2 when the control panel is moved from the rest position to the exposed position, and to be automatically moved back into body 2 when the control panel is returned to the rest position, housing 10 is attached to telescoping rail assemblies 12 via bars 16.2.

When the user causes control panel 6 to move from the rest position shown in FIG. 1 to the exposed position shown in FIGS. 2 and 3, drive means 14 rotates output shaft 14.1, and thus pinions 14.2. Pinions 14.2 ride on toothed racks 18 toward the front of the household appliance, so that positioning mechanism 16 and bars 16.2 and 16.3 are also moved toward the front of the household appliance. Since toothed racks 18 provide an upward path, bars 16.3, and thus control panel 6, are raised against gravity. At the same time, the movement of bars 16.2 causes housing 10 to be moved out of the interior of body 2; i.e., out of a position in which it is incorporated in body 2, as can clearly be seen in FIG. 3. As shown in FIG. 3, when control element 6 is in the exposed position, it assumes a position above the rest position. Moreover, housing 10 is then partially in front of the household appliance and easily accessible, namely in a filling position allowing reservoirs 8 to be filled with a fluid, here water, or to be removed.

The sequence of movements performed by control panel 6 and housing 10 during the movement of control panel 6 from the rest position to the exposed position is shown in more detail in FIGS. 4a through 4d. As can be seen therein, when control panel 6 is in the exposed position and the household appliance is in the operating position, the control panel is located in front of the front of the household appliance. These figures also show that during the movement of control panel 6 between the positions mentioned, the control panel is first moved to an intermediate position in front of the front of the household appliance (see FIG. 4b), and then from the intermediate position to the exposed position (see FIG. 4d).

Figure 5A:
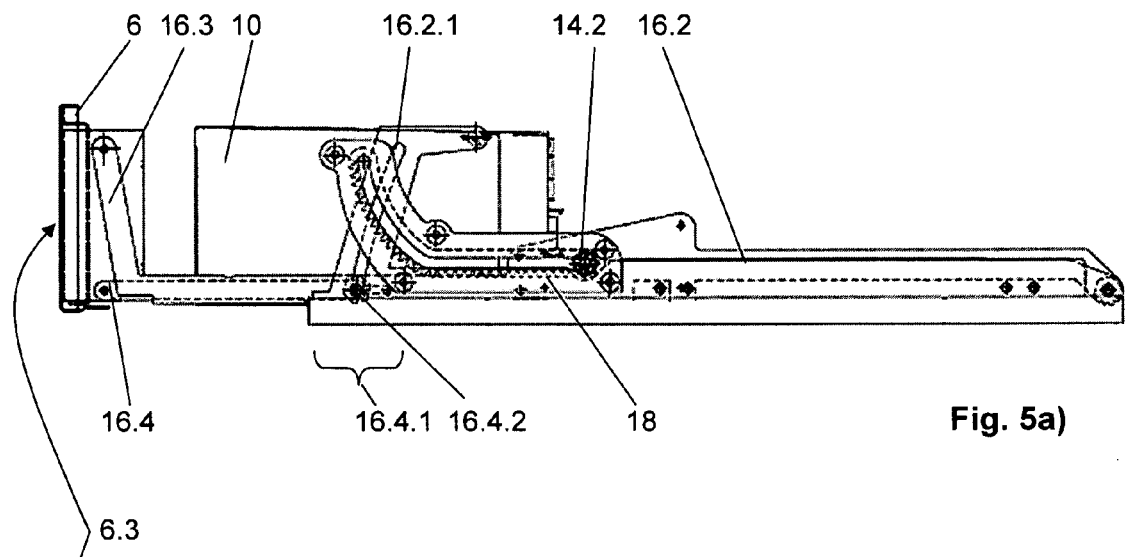
FIGS. 5*a*, 5*b* are views showing the household appliance in partial views similar to FIGS. 4*b* and-4*d*.
Figure 5B:
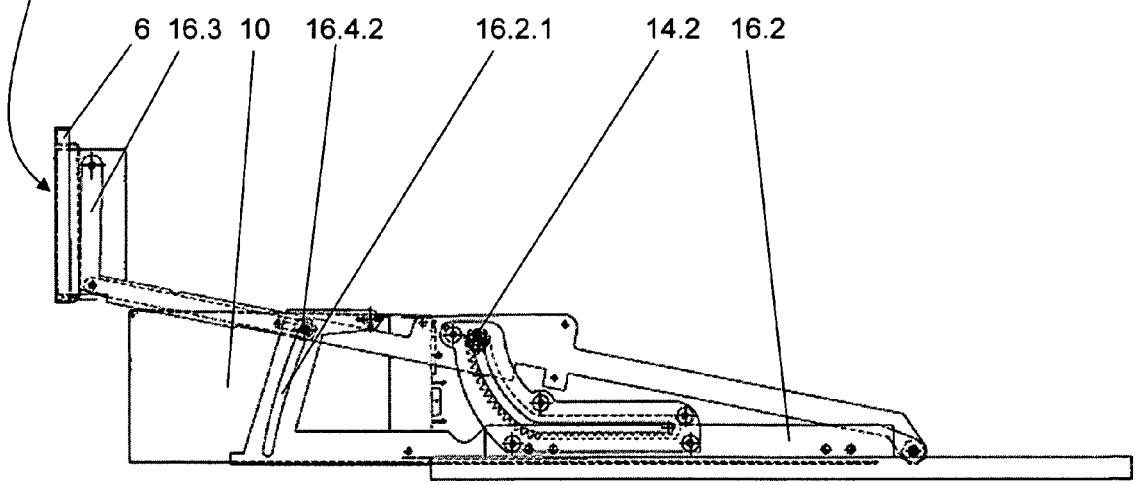

In order for user interface 6.3 of control panel 6 to substantially maintain its angle of inclination with respect to the remainder of the household appliance during the movement of control panel 6 between the rest position and the exposed position, positioning mechanism 16 is here provided with coupling bars 16.4, only one of which is shown in FIGS. 3 and 5. Coupling bars 16.4 run parallel to bars 16.3, which are U-shaped at the end facing the front. The kinematics of bars 16.3, coupling bars 16.4, and control panel 6 is illustrated in more detail in FIG. 5. FIG. 5a shows the situation when control panel 6 is in the intermediate position, and FIG. 5b shows the situation when control panel 6 is in the exposed position. At the end facing control panel 6, bars 16.3 are angled and pivotally connected to control panel 6. Coupling bars 16.4 are also pivotally connected to control panel 6. At the end 16.4.1 facing away from control panel 6, coupling bars 16.4 each have a pin 16.4.2 which engages an elongated slot 16.2.1 in the respectively associated bar 16.2. To this end, pin 16.4.2 must extend through the respective bar 16.3. For this purpose, bars 16.3 have a suitably formed elongated slot, which is not shown in greater detail. As explained earlier, bars 16.3 are raised as control panel 6 is moved from the rest position to the exposed position. Since coupling bars 16.4 are guided in the U-shaped portions of bars 16.3, the coupling bars 16.4 are also raised. At the same time, pin is guided in elongated slot 16.2.1, and specifically in a direction opposite to the moving direction of bars 16.2. This results in coupling bars 16.4 pulling control panel 6 in a direction opposite to the moving direction of bars 16.2; i.e., to the right in the plane of FIG. 5a, into the position that is shown in FIG. 5b and associated with the exposed position of control panel 6. With these structurally simple means, it is achieved that the angle of inclination of user interface 6.3 of control panel 6 is maintained, independently of its position relative to the remainder of the household appliance. For improved guidance of output shaft 14.1, pinions 14.2 are each provided with a pin-like extension which extends in an axial direction and engages a guide slot in a guide plate 19 attached to the respective toothed rack 18. In this regard, see in particular FIG. 4.

When the user wishes to return control panel 6 to the rest position, he or she presses the corresponding control 6.2. If reservoirs 8 are correctly inserted in housing 10, as explained above, the movement of control panel 6 from the exposed position back to the rest position occurs in a manner analogous to the above-described movement of control panel 6 to the exposed position, but in reverse order.

Figure 6:
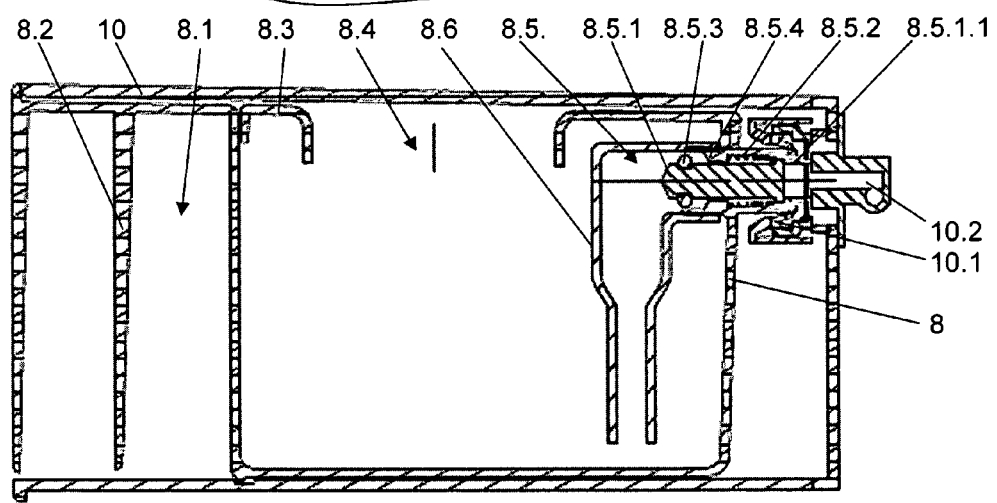
FIG. 6 is a cross-sectional view showing a portion of the household appliance in the region of the reservoir.
Figure 4A:
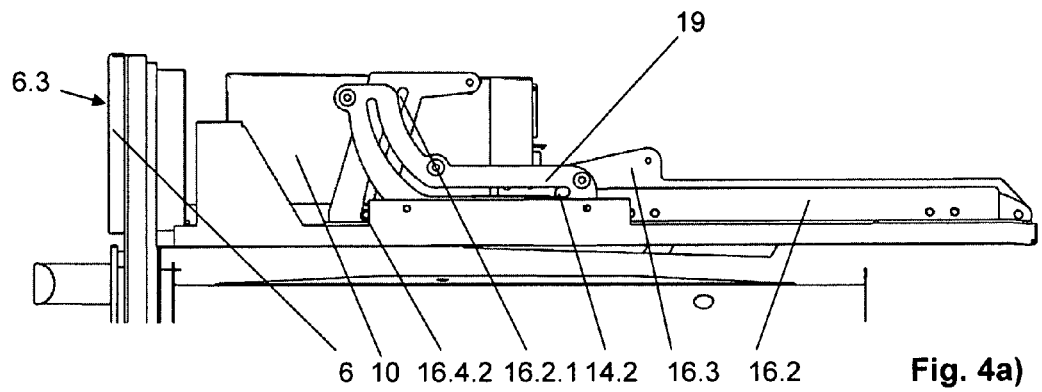
FIGS. 4*a*-4*d* are partial detail views showing different positions of the control panel from the side.
Figure 4B:
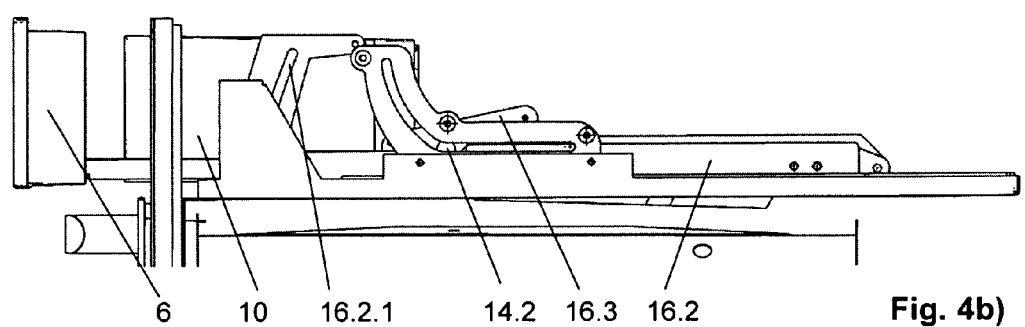
Figure 4C:
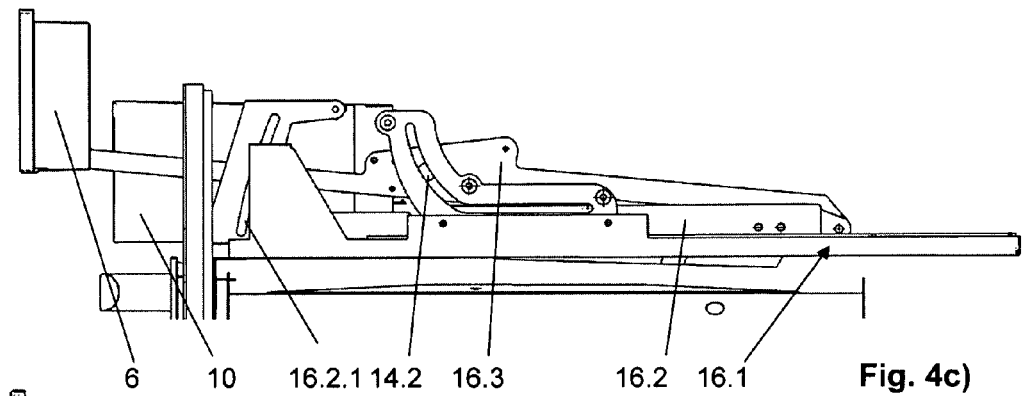
Figure 4D:
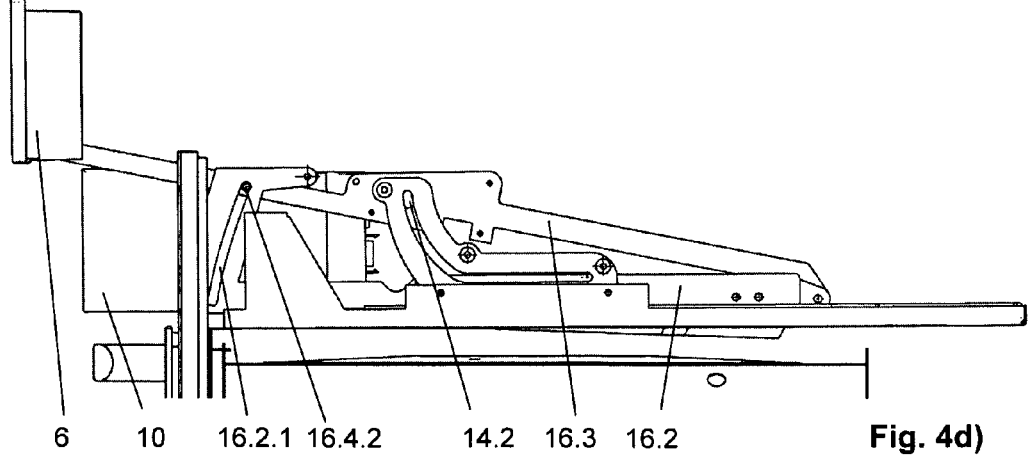

FIG. 6 shows one of the two identically constructed reservoirs 8 in a cross-sectional detail view. Reservoir 8 is configured in the manner of a drawer and can accordingly be slid into housing 10. Reservoir 8 is open at the top and is covered by a removable cover 8.3. Cover 8.3 has a filling opening 8.4. formed at its center. An outlet valve 8.5 of generally known type is provided at a side wall of reservoir 8 at the end facing cover 8.3. Valve 8.5 has a tubular suction port 8.6, which extends into reservoir 8. Valve 8.5 further has a central pin 8.5.1, which is biased by a spring 8.5.2 and which, when reservoir 8 is removed, is pressed by spring force against an abutment shoulder 8.5.4 via a sealing ring 8.5.3, thereby closing valve 8.5. When reservoir 8 is completely inserted into housing 10, abutment shoulder 8.5.4 of reservoir 8 presses against a ring-shaped seal 10.1 on a supply channel 10.2 of housing 10, so that the interface between reservoir 8 and supply channel 10.2 is sealed off from the environment. When inserting reservoir 8, pin 8.5.1 is moved into contact with housing 10 via an annular web 8.5.1.1 of valve 8.5, said annular web being integrally formed with pin 8.5.1. Spring 8.5.2 is compressed and tensioned, so that sealing ring 8.5.3 is lifted off of abutment shoulder 8.5.4. When water is then drawn from reservoir 8 by a pump or the like, such water can flow past sealing ring 8.5.3 into an annular channel surrounding pin 8.5.1 (not shown in greater detail), and is thus able to flow into supply channel 10.2 and further therethrough. The present invention is not limited to the exemplary embodiment described herein. For example, other household appliances that must or may be supplied with water, washing liquids, or other liquids, are also conceivable, such as cooking appliances, beverage preparing devices, refrigerators, laundry appliances, dishwashers, or the like. The same applies to household appliances which must or may be supplied with gaseous fluids. Such appliances, however, require the use of other types of reservoirs. Moreover, the positioning mechanism is freely selectable within wide suitable limits. The drive means can also be selected within wide suitable limits, unless an entirely hand-operated mechanism is desired. The user interface of the control panel does not necessarily have to remain the same independently of the position of the control panel. Also, for other applications, it may be desired that the angle of inclination change automatically in a predetermined manner as a function of the position of the control panel. The control panel does not necessarily have to be disposed at the upper edge of the household appliance. Moreover, depending on the type of household appliance and the location where it is placed or installed, the control panel may conveniently also be movable in directions other than upward. In a departure from the exemplary embodiment shown, it is also possible to use only one reservoir or more than two reservoirs.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

What is claimed is:

1. A household appliance, comprising:
   a control panel movable between a rest position and an exposed position; and
   a reservoir adapted for holding a fluid and having a tilling opening through which the reservoir is fillable with the fluid, the reservoir being disposed behind the control panel in an interior of the household appliance when the reservoir is in an operating position;
   wherein the control panel impedes access to at least one of the reservoir or the filling opening when the control panel is in the rest position and the reservoir is in the operating position, and wherein the control panel allows access to at least one of the reservoir or the filling opening when the control panel is in the exposed position, wherein the control panel is disposed adjacent an upper edge of the household appliance when the control panel is in the rest position, and wherein the exposed position of the control panel is disposed above the rest position.

2. The household appliance as recited in claim 1, wherein the control panel is disposed in front of a front of the household appliance when the control panel is in the exposed position and the reservoir is in the operating position.

3. The household appliance as recited in claim 1, further comprising a positioning mechanism interconnecting the control panel and a body of the household appliance, the positioning mechanism configured to move the control panel between the rest and exposed positions.

4. The household appliance as recited in claim 3, wherein the positioning mechanism is further configured to move the control panel to an intermediate position that is located between the rest and exposed positions, such that the control panel is movable to the intermediate position in front of the front of the household appliance before moving to the exposed position.

5. The household appliance as recited in claim 3, wherein the control panel includes a user interface having an angle of inclination relative to a remainder portion of the household appliance, and wherein the positioning mechanism is further configured to maintain the angle of inclination generally unchanged when the control panel is disposed in the rest and exposed positions, and during motion of the control panel between the rest and exposed positions.

6. The household appliance of claim 3, further comprising a drive device associated with the positioning mechanism and operable to move the control panel between the rest and exposed positions.

7. The household appliance as recited in claim 1, further comprising a housing disposed behind the control panel inside the household appliance, wherein the reservoir is removably supported in the housing.

8. The household appliance as recited in claim 7, further comprising a coupling mechanism interconnected between the control panel and the housing, the coupling mechanism being configured to move from an incorporated position within the household appliance to a filling position when the control panel moves from the rest position to the exposed position, wherein the reservoir is configured to be at least one of removed from the housing or filled with the fluid when the housing is in the filling position.

9. The household appliance as recited in claim 8, wherein the coupling mechanism is further configured to move from the filling position to the incorporated position when the control panel moves from the exposed position to the rest position.

* * * * *